United States Patent [19]

Imamura et al.

[11] Patent Number: 5,570,122
[45] Date of Patent: Oct. 29, 1996

[54] COMBINED READ AND PRINT HEAD

[75] Inventors: Masaya Imamura; Hiromi Ogata; Kensuke Sawase, all of Kyoto, Japan

[73] Assignee: Rohm Co., Ltd., Kyoto, Japan

[21] Appl. No.: 182,726

[22] Filed: Jan. 14, 1994

[30] Foreign Application Priority Data

May 7, 1993 [JP] Japan .................................. 5-106822

[51] Int. Cl.⁶ .............................. B41J 2/315; B41J 2/32; H04N 1/21; H04N 1/23
[52] U.S. Cl. ........................................ 347/171; 358/296
[58] Field of Search ..................... 347/209, 171, 347/237, 206; 358/472, 471, 296, 484, 286, 300; 250/208.1

[56] References Cited

U.S. PATENT DOCUMENTS 5,038,027  8/1991  Ioka ............................. 358/484
5,097,338  3/1992  Kuriyama et al. ............... 358/482
5,162,916  11/1992 Stemmle et al. .................. 358/296
5,272,489  12/1993 Kobayashi et al. ............... 347/206

Primary Examiner—Benjamin R. Fuller
Assistant Examiner—Thinh Nguyen
Attorney, Agent, or Firm—Brumbaugh, Graves Donohue & Raymond

[57] ABSTRACT

A glass cover is mounted on the top portion of a frame and, in the frame, a light source substrate with a light emitting element packaged therein is fixed and a rod lens array is fixed, a substrate with a light receiving element packaged therein is disposed in the lower portion of the frame, a substrate including a heating resistor is mounted in the lower portion of the frame, a drive element for driving the heating resistor is packaged on the back side of the substrate, and the drive element is electrically connected with the substrate.

9 Claims, 2 Drawing Sheets

COMBINED READ AND PRINT HEAD

BACKGROUND OF THE INVENTION

1. Field of the Invention

The present invention relates to a combined read and print head which includes an image sensor part for reading image information optically and a print head part for printing the read image information in such a manner that the two parts are integrally combined into one.

2. Discussion of the Prior Art

An example of a conventional image sensor is shown in FIG. 2 (which is a section view of main portions thereof). In the conventional image sensor, a transparent cover (glass cover) 51, which is brought in contact with an object to be photographed (such as a manuscript or the like), is attached to the top portion of a frame 50, and a light source substrate 53 having a light emitting element 52 serving as a light emitting section packaged therein is fixed to the frame 50 at an angle of inclination with respect to the surface of the glass cover 51. Also, a rod lens array 54, which is an optical system used to condense the reflected light from the object to be photographed on the glass cover 51, is fixed to the frame 50 perpendicularly to the surface of the glass cover 51. Further, in the lower portion of the frame 50, there are provided a light receiving element 55 serving as a light receiving section and a light receiving substrate 57 with a connector 56 packaged therein for connection with an external circuit.

Now, as a print head, an example of a thermal print head is shown in FIG. 3 (which is a sectional view of main portions thereof). The thermal print head includes a ceramic substrate 61 having a heating resistor 60 which extends in a print direction, a glass epoxy substrate 64 in which a drive element (IC) 62 for driving the heating resistor 60 and a connector 63 for connection with an external circuit are packaged, and a radiation plate 65 for supporting the substrates 61, 64 and also for radiating the heat of, especially, the substrate 61. The pattern wiring of the substrate 61 is wire bonded to the drive element 62 of the substrate 64 by means of a wire 66, and the wire bonded portion is covered with a resin mold 67. Alternatively, the connection between the two substrates 61 and 64 may be achieved by use of a flexible substrate.

Conventionally, in general, in an apparatus such as a facsimile, a copying machine, a work station and the like, there are included an image sensor and a print head which are respectively structured in the above-mentioned manner. That is, the conventional apparatus is generally arranged such that the image sensor reads image information optically and then the print head prints the read image information.

However, in the conventional apparatus, in general, the image sensor and print head are arranged separately from each other. This makes it necessary to manufacture the image sensor and print head individually, which results in the high manufacturing cost. Also, because the image sensor and print head are mounted individually, the mounting cost thereof is also increased. As a result, the cost of the whole apparatus is increased. Further, since the image sensor and print head are separate from each other, there is required a larger space to incorporate them into the apparatus, which provides an obstacle to size reduction of the whole apparatus.

SUMMARY OF THE INVENTION

Accordingly, in view of the above-mentioned problems found in the conventional structures, it is an object of the invention to provide a combined read and print head which makes it possible to reduce the cost and size of various apparatus including an image sensor and a print head.

In attaining the above object, according to the invention, there is provided a combined read and print head which includes an image sensor part comprising a transparent cover mounted on a frame which is brought in contact with an object to be photographed and, in the frame, a light emitting section for radiating light onto the object to be photographed, an optical system for condensing the reflected light from the object to be photographed and a light receiving section for receiving the light from the optical system, and a print head part comprising a print section extending in the longitudinal direction of the frame, and a driver section for driving the print section in accordance with image information read by the image sensor, the print head part being mounted to the frame at a suitable position thereof.

The combined read and print head of the invention has a great structural characteristic that the image sensor part for reading the image information optically is combined integrally with the print head part for printing the read image information. With this structure, the image sensor and the print head, which have been conventionally provided separately from each other, can be combined into one compact unit. Therefore, there are eliminated the needs to manufacture the image sensor and print head separately and to install them into an apparatus separately, thereby being able to reduce the cost of the whole apparatus. Also, the integrated structure, when compared with the conventional structure in which the image sensor and print head are provided separately, can reduce greatly a space used to incorporate them into the apparatus and thus reduce the size of the apparatus.

BRIEF DESCRIPTION OF THE DRAWINGS

Other objects, advantages and features of the invention will be apparent when carefully reading the following detailed description in connection with the accompanying drawings, in which.

DETAILED DESCRIPTION OF THE EMBODIMENT

Now, description will be given hereinbelow of a combined read and print head according to the invention by way of an embodiment thereof.

Figure 1:
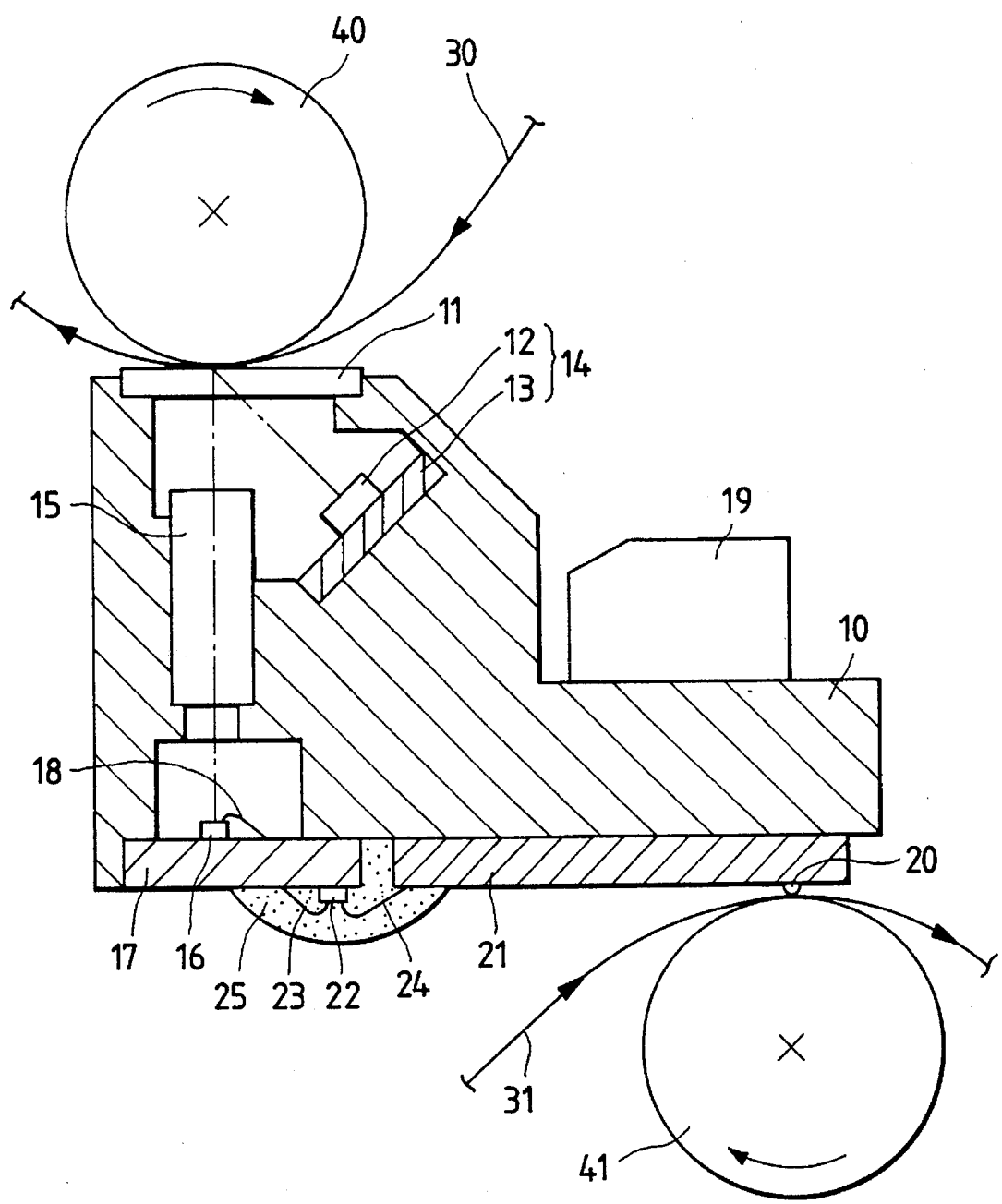
FIG. 1 is a section view of main portions of an embodiment of a combined read and print head according to the invention.
Figure 2:
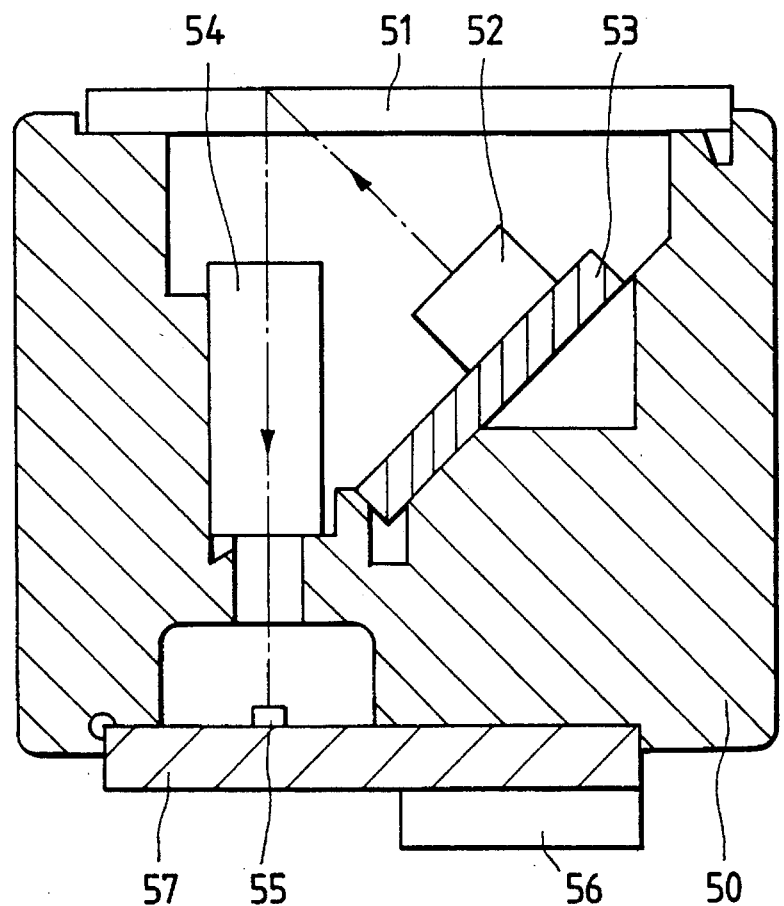
FIG. 2 is a section view of main portions of an image sensor according to the prior art.
Figure 3:
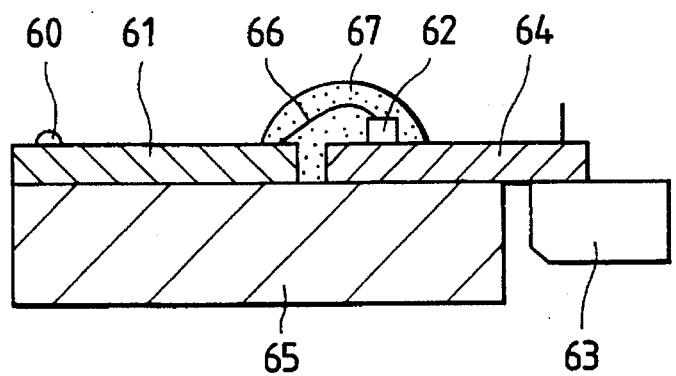
FIG. 3 is a section view of main portions of a thermal print head according to the prior art.

A section view of main portions of an embodiment of a combined read and print head according to the invention is shown in FIG. 1. The combined read and print head includes an image sensor part in which, as shown in FIG. 1, a transparent cover (glass cover) 11 is mounted on the top portion of a frame 10 having such a sectional configuration as shown in FIG. 1. In the frame 10, an illumination unit 14 composed of a light emitting element (such as an LED chip or the like) and a light source substrate 13, in which the light emitting elements 12 are packaged in an array manner, is fixed to the surface of the glass cover 11 at an angle of inclination (for example, about at an angle of 45°) and also a rod lens array 15, which is an optical system used to condense the reflected light from a manuscript 30 to be sent onto the glass cover 11 by a platen 40, is fixed perpendicularly with respect to the surface of the glass cover 11. Just below the rod lens array 15, there is disposed a substrate 17 in which a light receiving element (photodiode or the like) 16 for receiving the light from the array 15 is packaged in an array manner. Also, the light receiving element 16 is wire bonded to the pattern wiring of the substrate 17 by means of a wire 18.

On the other hand, the print head part consists of a thermal print head in the present embodiment. That is, a substrate 21 with a heating resistor (a print part) 20 extending in the longitudinal direction of the frame 10 is mounted in parallel to the substrate 17 on the bottom portion of the frame 10. A drive element (a driver section such as an IC or the like) for driving the heating resistor 20 is packaged on the back side of the substrate 17 and is also wire bonded to the pattern wiring of the back side of the substrate 17 and to the pattern wiring of the substrate 21 respectively by means of wires 23, 24. The portion in which the drive element 22 and wires 23, 24 exist is covered with a resin mold 25. And, under the substrate 21, there is disposed a platen 41 which is used to feed print paper (thermal paper) 31. The frame 10 includes a connector 19 which is used to connect the present thermal print head with an external circuit, and the connector 19 is also electrically connected with the respective circuits of the light receiving section, light emitting section, print section and driver section.

In the present embodiment, since the substrate 21 having the heating resistor 20 is mounted directly on the frame 10, the frame 10 is preferably formed of a material having a high thermal conductivity so that heat to be generated in the heating resistor 20 can be radiated with a good efficiency. That is, in this case, the frame 10 combines the function of a frame in a normal image sensor with the function of a radiator plate in a normal print head. Also, the drive element 22 for driving the heating resistor 20 is packaged on the back side of the substrate 17 in the image sensor part. This structure is advantageous in space saving, material cost saving and the like, when compared with a structure in which the light receiving element 16 and drive element 22 are packaged in separate substrates. Of course, although the light receiving circuit on the front side of the substrate 17 and the drive circuit on the back side thereof are independent in structure of each other, they are connected with each other electrically.

In the combined read and print head structured in the above-mentioned manner, at first, in the image sensor part thereof for reading the image information, the manuscript 30 is sent onto the glass cover 11 by the platen 40. The light that is emitted from the light emitting element 12 is radiated onto the manuscript 30 on the glass cover 11, and the reflected light from the manuscript 30 is condensed by the rod lens array 15, received by the light receiving element 16 and is converted into an electric signal. The conversion of the image information into the electric signal is executed according to the feeding operation of the manuscript 30.

In the print head part, in accordance with the image information signal transmitted from the image sensor part, heat is generated in a given portion of the heating resistor 20 by the drive element 22. The thermal paper 31 sent by the platen 41 reacts thermally with the heated portion of the heating resistor 20, with the result that an image is printed in the portion of the thermal paper in contact with the heated portion of the heating resistor 20.

Here, the combined read and print head illustrated in the above embodiment is only an example and, of course, the invention is not limited to this. In particular, the print head part need not be always provided in the bottom portion of the frame, but it can also be mounted in any other proper portion of the frame. Also, the way of connection between the circuit of the image sensor part and the circuit of the print head part may be changed properly according to cases.

As has been described heretofore, the combined read and print head of the invention provides the following effects, since it combines an image sensor part and a print head part as an integrated structure.

(1) Since the image sensor part and print head part can be integrally structured with each other by use of the respective dead spaces of the two parts, when compared with a structure in which the image sensor part and print head part are provided separately from each other, the mounting space thereof can be reduced greatly and thus the space of the present head can be saved, so that the size of the whole apparatus incorporating the present head can be reduced.

(2) Because the present head can be installed to the apparatus at one time, the installation cast of the present head can be reduced.

(3) As the frame can serve also as a radiation plate, the installation cost and material cost of the present head can be reduced.

(4) Due to the fact that the light receiving element and drive element can be packaged in the same substrate, the installation cost and material cost of the present head can be reduced.

(5) Since the number of parts used can be reduced, the installation cost of the present head can be reduced.

(6) Because a connector for connection with an external circuit can be used in common in the image sensor part and print head part, the installation cost and material cost of the present head can be reduced.

(7) Due to (2) to (6), the cost of the whole apparatus can be reduced.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A combined read and print head, comprising:

an image sensor part including a frame, a transparent cover to be contacted by an object to be photographed mounted on said frame, a light emitting section disposed in said frame for radiating light onto a linear portion of the transparent cover to illuminate a linear region of said object to be photographed, a first drive roller for driving the object to be photographed perpendicularly to a linear extent of the linear portion of the transparent cover, an optical system for condensing the reflected light from said object to be photographed, and a light receiving section having a linear array of light-receiving elements for receiving the light from said optical system, and a print head part including a print section having a linear array of printing elements extending in a longitudinal direction of said frame, and a driver section for driving said print section according to image information read by said image sensor part, said print head part being mounted in a part of said frame, and a second drive roller independent of the first drive roller for driving a printing substrate in a direction perpendicular to an extent of the linear array of printing elements.

2. A combined read and print head as claimed in claim 1, wherein said image sensor part comprises an image sensor of a close contact type and said print head part comprises a thermal print head.

3. A combined read and print head as claimed in claim 1, wherein said print section comprises a heating resistor.

4. A combined read and print head as claimed in claim 3, wherein said frame is made of a material having a high thermal conductivity to radiate heat generated from said heating resistor.

5. A combined read and print head as claimed in claim 1, wherein said driver comprises an IC.

6. A combined read and print head as claimed in claim 1, wherein said light emitting section comprises an LED array.

7. A combined read and print head as claimed in claim 1, wherein said optical system comprises a rod lens array.

8. A combined read and print head as claimed in claim 1, wherein said light receiving section comprises a linear photodiode array.

9. An electronic apparatus including a combined read and print head, said head comprising:

an image sensor part including a frame, a transparent cover to be contacted by an object to be photographed mounted on said frame, a light emitting section disposed in said frame for radiating light onto a linear portion of the transparent cover to illuminate a linear region of said object to be photographed, a first drive roller for driving the object to be photographed perpendicularly to a linear extent of the linear portion of the transparent cover, an optical system for condensing the reflected light from said object to be photographed, and a light receiving section having a linear array of light-receiving elements for receiving the light from said optical system, and a print head part including a print section having a linear array of printing elements extending in a longitudinal direction of said frame, and a driver section for driving said print section according to image information read by said image sensor part, said print head part being mounted in a part of said frame, and a second drive roller independent of the first drive roller for driving a printing substrate in a direction perpendicular to an extent of the linear array of printing elements.

* * * * *